US005589654A

United States Patent [19]

Konwiser et al.

[11] Patent Number: 5,589,654

[45] Date of Patent: Dec. 31, 1996

[54] ELECTRONIC DANCE FLOOR SYSTEM

[76] Inventors: Kern T. Konwiser; Kip M. Konwiser, both of 1 Catamaran St., Ste. A, Marina Del Rey, Calif. 90292

[21] Appl. No.: 612,117

[22] Filed: Mar. 7, 1996

[51] Int. Cl.[6] .............................. G01H 1/02; G01H 1/55

[52] U.S. Cl. .............................. 84/600; 84/644; 84/645; 84/670; 84/718

[58] Field of Search .............................. 84/600, 645, 644, 84/670, 718, 464.R A; 36/139

[56] References Cited

U.S. PATENT DOCUMENTS

| | | | |
|---|---|---|---|
| 1,943,222 | 9/1934 | Landi | 36/8.3 |
| 2,644,248 | 7/1953 | Seligman | 36/7.5 |
| 2,933,832 | 4/1960 | Ayala et al. | 36/7.5 |
| 2,940,184 | 6/1960 | Malone | 36/1 |
| 3,501,144 | 3/1970 | Schmidt | 273/1 |
| 3,596,024 | 11/1971 | Smith | 200/86.5 |
| 3,702,999 | 11/1972 | Gradisar | 340/272 |
| 3,749,810 | 7/1973 | Dow | 84/1.24 |
| 3,775,546 | 11/1973 | Honegger | 84/1.01 |
| 3,794,375 | 2/1974 | Pfeiffer | 128/2 s |
| 3,865,001 | 2/1975 | Hershey | 84/1.03 |
| 3,956,958 | 5/1976 | Nash et al. | 84/1.01 |
| 4,955,276 | 9/1990 | Feldman et al. | 84/403 |
| 5,461,188 | 10/1995 | Drago et al. | 84/600 |

*Primary Examiner*—William M. Shoop, Jr.
*Assistant Examiner*—Marlon T. Fletcher

[57] ABSTRACT

An electronic dance floor system (10) that consists of a dance floor (12) having at least two dancing sections (14) with each section further having at least four composite pad assemblies (16). Each of the assemblies (16) is connected through a musical instrument digital interface (MIDI) converter (100) to a MIDI equipped sound source (102). When a dancer, during his or her dance routine, steps on selected assemblies (16), an electrical switch module (34) embedded in each assembly triggers the MIDI converter which, in turn, energizes the sound source. Thus, by stepping on selected assemblies (16) a dancer can produce sounds that compliment the dancer's stepping routine. The system (10) can also be designed to include a pair of tapping shoes (110). The shoes independently allow a sound(s) to be produced that enhances the sound(s) produced by the dance floor (12).

22 Claims, 6 Drawing Sheets

ELECTRONIC DANCE FLOOR SYSTEM

TECHNICAL FIELD

The invention pertains to the general field of electronic musical devices and more particularly to an electronic dance floor system that when stepped upon, produces sounds and visual images that are responsive to the dancer's steps.

BACKGROUND ART

Musical instruments exist in many types and forms, ranging from the simple wind instruments such as the whistle or flute to instruments which rely on mechanical air pressure or electronic means to produce the desired sounds. Most musical instruments require the user to possess a music reading ability in combination with a certain degree of skill with the particular instrument. Other musical instruments require the user to have an "ear" for music, along with a considerable degree of skill with the particular instrument.

Conventionally, musical tone is generated by playing a piano, a violin, a guitar, a drum or other musical instruments. The musical tone is also often accompanied by a voice generated from the player who sings. Meanwhile, the conventional musical tone generating apparatus controls tone characteristics, such as the tone color, the tone pitch and the tone volume of the musical tone in response to the playing for example, of an electronic musical instrument. Also, many musicians tend to move with the music they are playing but are limited in this expression by the confining characteristics of the instruments, except in the case of some of the lighter, hand-held instruments. Few, if any, instruments provide a means for a musician to create music responsive to body movements or are capable of converting the movement of a player into a musical tone.

There are step-on type, tone scale devices that exist for children, wherein step plates are arranged in accordance with a tone scale and are provided on a somewhat wide and rigid platform. By stepping on the plates, the corresponding musical sounds are then produced from an attached or external speaker. Unfortunately, these devices do not fulfill the needs of the serious professional musician or performer and are therefore unused and readily dismissed by most musicians and performers.

A search of the prior art did not disclose any patents that read directly on the claims of the instant invention, however the following U.S. patents are considered related:

| U.S. Pat. No. | INVENTOR | ISSUED | |
|---|---|---|---|
| 5,081,896 | Hiyoshi, et al | 21 January | 1992 |
| 4,924,743 | Tsai | 15 May | 1990 |
| 4,245,539 | Jones | 20 January | 1981 |
| 4,121,488 | Akiyama | 24 October | 1978 |
| 3,922,944 | Kurosaki, et al | 2 December | 1975 |

The U.S. Pat. No. 5,081,896 Hiyoshi, et al patent discloses a musical tone generating apparatus that converts the movement of a person into a musical tone. The movements include a walking or running movement, a jumping movement, a rubbing movement, a beating movement, a turning movement and the like. More specifically, tone pitch, tone color, tone volume or other parameters of the musical tone to be generated are controlled based on various elemental values. These values include the value of moving speed, a jumped height or of frictional heat produced by the rubbing movement of a player's hands.

The U.S. Pat. No. 4,924,743 Tsai patent discloses a set of sounding blocks which can be optionally arranged. Each block is provided with an electronic or a mechanical sounding device. Upon a treading on an individual block by a player's foot, the sounding block can be actuated to produce musical sound with respect to a specific scale note and upon a continuous treading on the blocks, an entire musical composition or song can be completed.

The U.S. Pat. No. 4,245,539 Jones patent discloses an apparatus for providing signals of varying volume and pitch. The signals are functions of the magnitude and distribution respectively, of a weight placed upon a platform hinged at one corner and swingable in mutually orthogonal directions. Sensors convert the physical displacements occurring at first and second corners opposite of the platform adjacent to the hinged corner into signals for controlling the volume and pitch of an output signal. Alternately, displacement of the operator's fingers.

The U.S. Pat. No. 4,121,488 Akiyama patent discloses a step-on tone scale play device that includes a flexible mat within which is arranged a plurality of flexible switch elements in accordance with a tone scale. The mat is adapted to produce corresponding music sounds when marks, configured on the surface of the mat that indicate the position of each switch element, are stepped on.

The U.S. Pat. No. 3,922,944 Kurosaki et al patent discloses a stepping musical machine for physical and acoustic training of children such that stepping boards are arranged on a jumpy sheet, a net or the like, stretched in a taut condition. The machine is adaptable so that when children jump on the stepping boards, while playing on the machine, particular sounds corresponding to the respective stepping boards are produced.

For background purposes and as indicative of the art to which the invention is related reference may be made to the remaining cited patents.

| U.S. Pat. No. | INVENTOR | ISSUED | |
|---|---|---|---|
| 5,406,176 | Sugden | 11 April | 1995 |
| 5,373,096 | Suzuki et al | 13 December | 1994 |
| 5,329,431 | Taylor et al | 12 July | 1994 |
| 5,192,823 | Suzuki et al | 9 March | 1993 |
| 5,166,463 | Weber | 24 November | 1992 |
| 5,105,708 | Suzuki et al | 21 April | 1992 |
| 5,063,821 | Battle | 12 November | 1991 |
| 5,001,852 | Schwartz | 3 March | 1991 |
| 4,043,241 | Liu | 23 August | 1977 |
| 3,070,907 | Rocco | 1 January | 1963 |

DISCLOSURE OF THE INVENTION

The electronic dance floor system in its most basic design, consists of:

1) A composite pad assembly having an internal electrical switch module. When the pad assembly is pressed, an analog trigger signal is produced, 2. An electrical cable assembly attached between the output of the electrical switch module and the input of a musical instrument digital interface (MIDI) converter. The MIDI converter receives and converts the analog trigger signal to a corresponding digital signal, and 3. A MIDI equipped sound source that, through an audio cable, receives the digital signal and produces a specific sound.

The composite pad assemblies are arranged in groups of four to form a dancing section. Likewise, at least two but preferably three dancing sections are joined to produce the electronic dance floor system. A dancer utilizes the system by moving across the electronic dance floor, thus triggering the MIDI equipped sound source to produce the desired sound(s). In addition to selectable sounds, the system can also be equipped with video images that compliment and enhance the sounds.

The system can be used in a myriad of applications including choreographed live performances, multimedia applications in which dancer or other performers create selected and spontaneous music as they step across the dance floor. Although entertainment is the primary utility of the invention, the system also finds utility in physical therapy for emotional and physically challenged persons to reduce emotional and physical barriers by utilizing free form movement and creative expressions. One form of physical therapy that appears to be suitable for the use of the invention is called PNI or Psycho Neuro Immunology. PNI is commonly practiced by such institutions as the Starbright Foundation and is a rapidly growing method of treatment in the field of physical and mental therapy. In summary, the invention allows both children and adults to make music and video images by walking, running and/or jumping on the electronic dance floor.

In view of the above disclosure, it is the primary object of the invention to produce an electronic dance floor that when activated by a dancer stepping on the floor, the floor produces selected sounds and video images that correspond to the dancer's steps.

In addition to the primary object of the invention it is also an object of the invention to produce an electronic dance floor that:

1) can convert the movement of a dancer or performer into a musical tone, 2) creates music responsive to body movements, 3) can be produced to cover small dance floors or large dance floors that can accommodate several persons, 4) is easily assembled and disassembled, 5) is easily stored when not in use, 6) is easily transported from venue to venue, for ease of use "on the road", 7) can be used by a dancer, a dance troupe, a solo performer, a band or any combination thereof, 8) can be used to create visual images responsive to body movements, 9) can be used by both the professional performer and the novice, and 10) is reliable and relatively maintenance free.

These and other objects and advantages of the present invention will become apparent from the subsequent detailed description of the preferred embodiment and the appended claims taken in conjunction with the accompanying drawings.

BEST MODE FOR CARRYING OUT THE INVENTION

Figure 1:
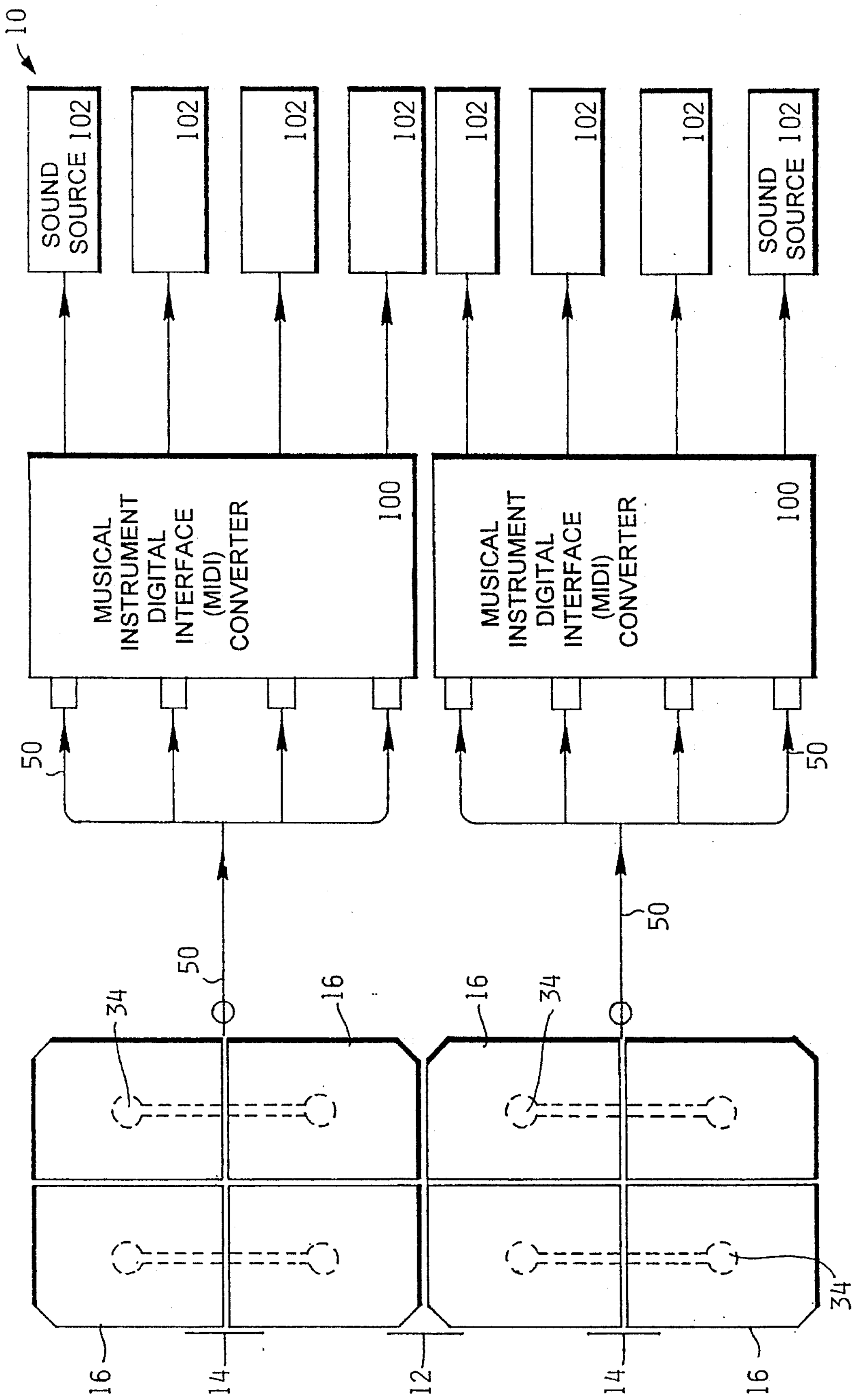
FIG. 1 is a block diagram of the overall electronic dance floor system.

The best mode for carrying out the electronic dance floor system 10 is presented in terms of a preferred embodiment that converts a dancer's steps into an environment of sounds and images. The preferred embodiment as shown in FIGS. 1–17 is comprised of four major elements: a composite pad assembly 16, an electrical cable assembly 50, a musical instrument digital interface (MIDI) converter 100 and a MIDI equipped sound source 102.

The electronic dance floor system 10 is comprised of a dancing section 14 that is further comprised of four rectangular composite pad assemblies 16. A typical and preferred dance floor 12 is comprised of three dancing sections 14 with each section having four pad assemblies 16 for a total of twelve pad assemblies 16. For simplicity and ease of description, a dance floor 12 incorporating two dance sections 14 is shown in FIG. 1. However, a plurality of dancing sections 14 can be arranged and attached side-by-side to form a dance floor 12 that can be sized to produce as large or a small dancing area as is desired.

Figure 2:
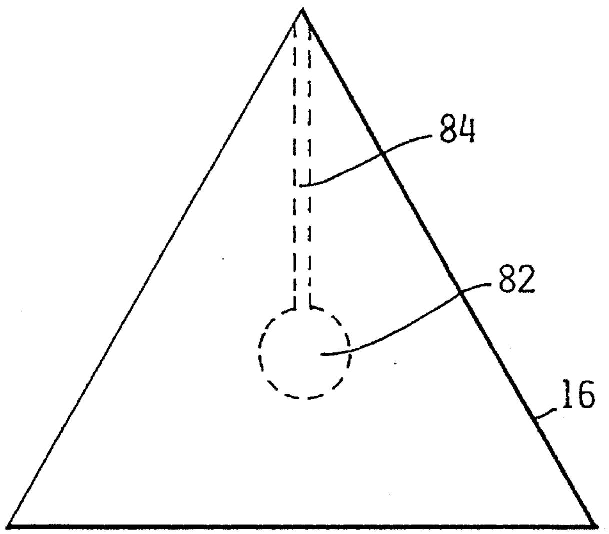
FIG. 2 is an upper plan view of a composite pad assembly shaped as an equilateral triangle.
Figure 3:
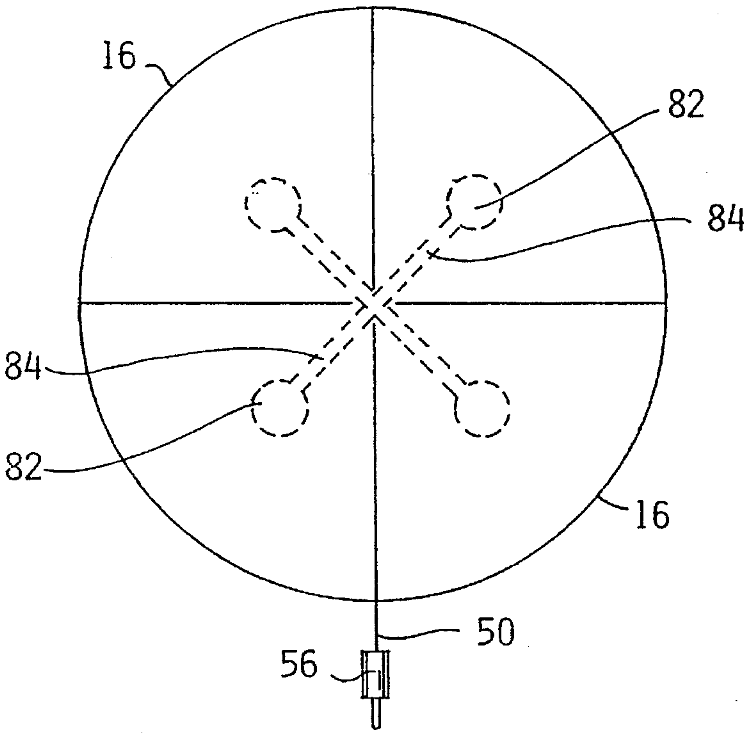
FIG. 3 is a composite pad assembly having a pie shape, where when all the pie shaped assemblies are interfaced, a circular dancing section is produced.

The preferred shape of the composite pad assembly 16 is rectangular as shown in FIG. 1. However, an assembly 16 having an equilateral triangular shape as shown in FIG. 2 or a pie shaped segment as shown in FIG. 3 may also be employed. When the triangular shaped assemblies are joined together, they form a dancing section 14 that resembles a six sided polygon; likewise, the pie shaped segments form a circular dancing section 14. Additionally, in lieu of a flat dance floor 12, the floor can be designed in the shape of a staircase, a multi-level platform that is integrated into the set design of a live performance or, a flat floor divided into dancing sections 14.

Each of the composite pad assemblies 16, as well as each dancing section 14, can be made with edges that abut each other without any attachment means. However, the assemblies 16 and sections 14 can be made with complimentary attachment edges 18 that allow interfacing assemblies 16 and sections 14 to be temporarily attached.

Figure 4:
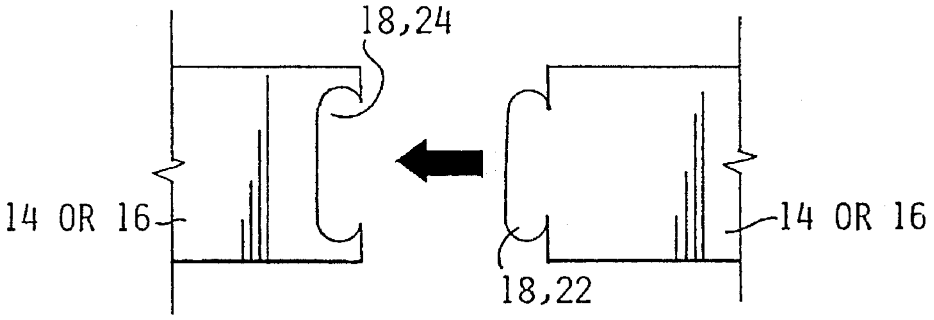
FIG. 4 is a partial elevational view of a composite pad assembly having interfacing edges that include complimentary tongue and groove sections.
Figure 5:
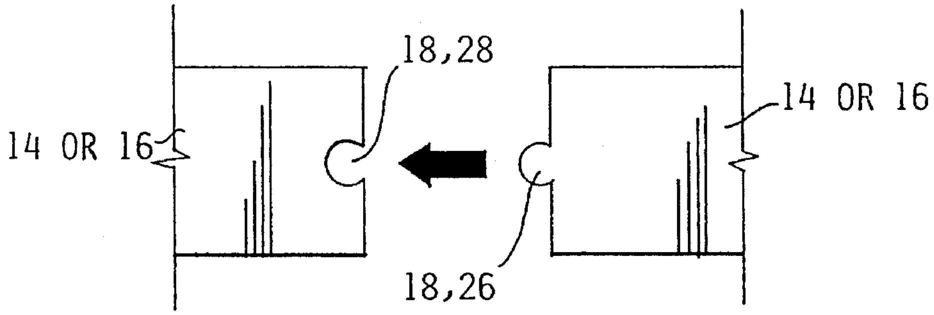
FIG. 5 is a partial elevational view of a composite pad assembly having interfacing edges that include a plurality of complimentary male and female detents.
Figure 6:
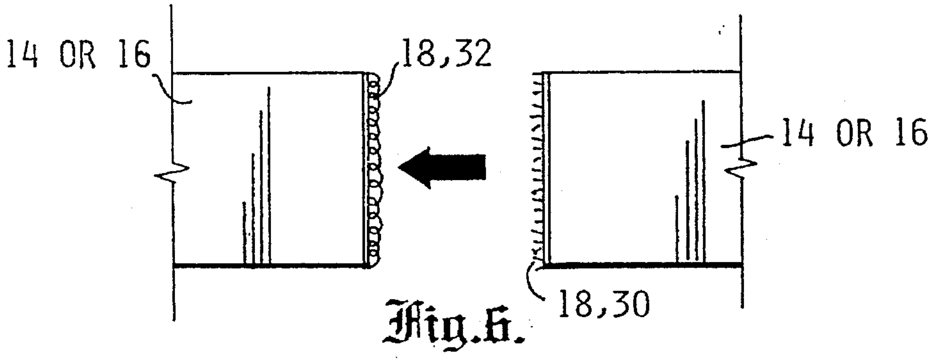
FIG. 6 is a partial elevational view of a composite pad assembly having interfacing edges that include complimentary hook and loop fasteners.

The complimentary attachment edges 18 can consist of tongue 22 and groove 24 edges as shown in FIG. 4 or they can consist of a plurality of male detents 26 and female detents 28 as shown in FIG. 5. Alternatively, an attachment means can be obtained by attaching complimentary hook 30 and loop 32 fasteners to the complimentary attachment edges 18 as shown in FIG. 6. Hook and loop fasteners are commonly sold under the trademark VELCRO.

Figure 7:
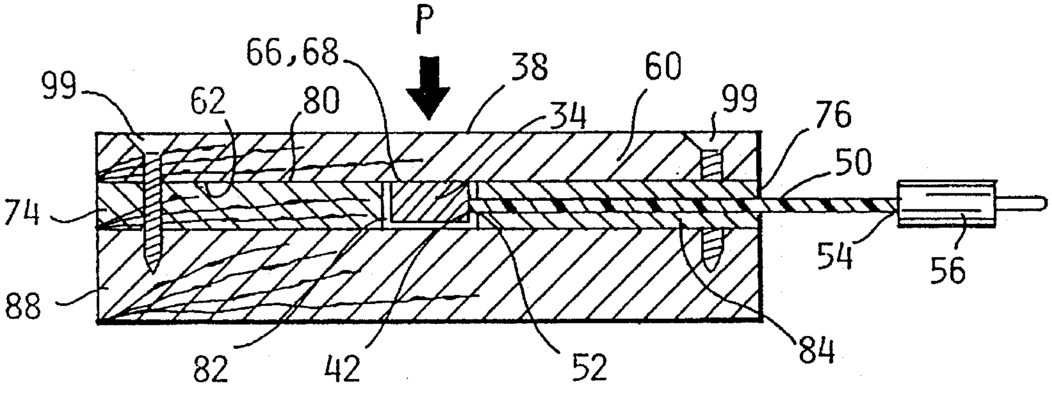
FIG. 7 is a cross-sectional view of a composite pad assembly that includes the attachment of the electrical cable assembly.

The composite pad assembly 16, as shown in a plan view in FIG. 1 and in a sectional view in FIG. 7, is comprised of five elements: an electrical switch module 34, an electrical cable assembly 50, an upper pad section 60, a center section 74 and a lower base section 88.

Figure 8:
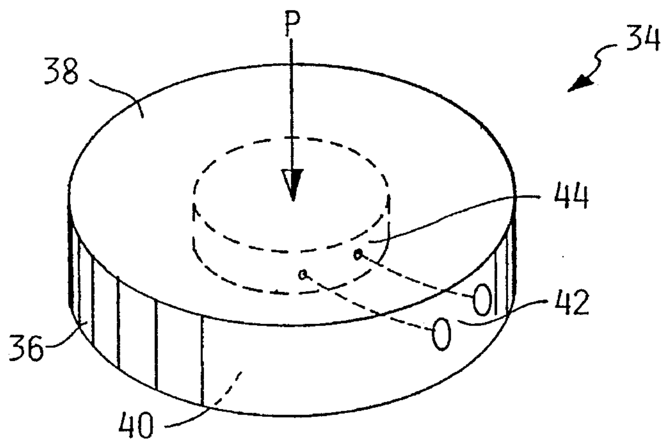
FIG. 8 is a perspective view of a typical electrical switch module showing a switch that terminates at a pair of output terminals.
Figure 9:
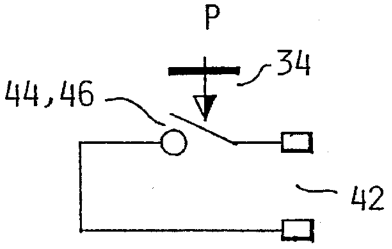
FIG. 9 is a schematic diagram of a typical, sensitive mechanical switch that closes when pressure is applied to the switch contact.
Figure 10:
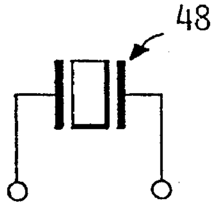
FIG. 10 is a schematic diagram of a typical piezzo-electric element that functions as a pressure activated switch.

The electrical switch module 34 as shown in FIG. 8, has a side surface 36, an upper surface 38, a lower surface 40 and an output that terminates at a pair of output terminals 42 that project from the module's side surface 36. The module 34 is designed to close an internal switch 44 that may consist of a sensitive mechanical switch 46, as shown in FIG. 9 or a piezzo-electric element 48 as shown in FIG. 10. In either case, the switch 44 closes when a pressure P as best shown in FIG. 7, is applied to the upper surface 38 of the module 34. The closure of the switch produces an analog trigger signal that is applied through the electrical cable 50.

The electrical cable 50 as shown in FIGS. 1 and 7 preferably consists of a shielded, two-conductor audio cable. The cable has an inward end 52 and an outward end 54. The inward end 52 is attached by a soldering process to the output terminals 42 of the electrical switch module 34; the outward end 54 is attached to an output jack 56 that preferably consists of an audio output jack. As shown in FIG. 1, when the dancing section 14 consists of four composite pad assemblies 16, each composite pad assembly typically measures 48 inches by 32 inches (122 cm by 81 cm). With these measurements, 544 inches (1382 cm) of audio cable 50 is necessary to produce four cables, as shown in FIG. 1. Additionally, to maintain equidistant length of each of the four cables, two of the cables that are further from the cable exit edge of the assemblies 14, must be 16 inches (40.6 cm) larger when the composite pad assemblies 16 are attached as shown in FIG. 1.

The structure of each composite pad assembly 16 as shown in FIG. 7, is comprised of an upper pad section 60, a center section 74 and a lower base section 88.

Figure 11:
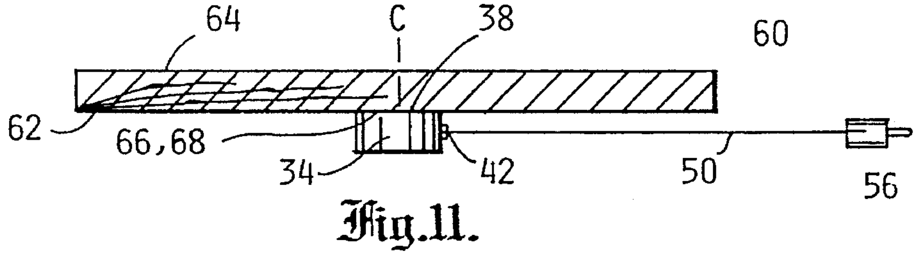
FIG. 11 is an elevational side view of an upper pad assembly showing the central location of the electrical switch module and the electrical cable assembly.

The upper pad section 60 as best shown in FIG. 11 has a lower surface 62 and an upper surface 64. To the center C of the lower surface 62 is attached, by an attachment means 66, the upper surface 38 of the electrical switch module 34 with the electrical cable assembly 50 attached to the module. The attachment means 66 may consist of an adhesive 68 or alternatively, tape (not shown) may be used to secure the module.

Figure 12:
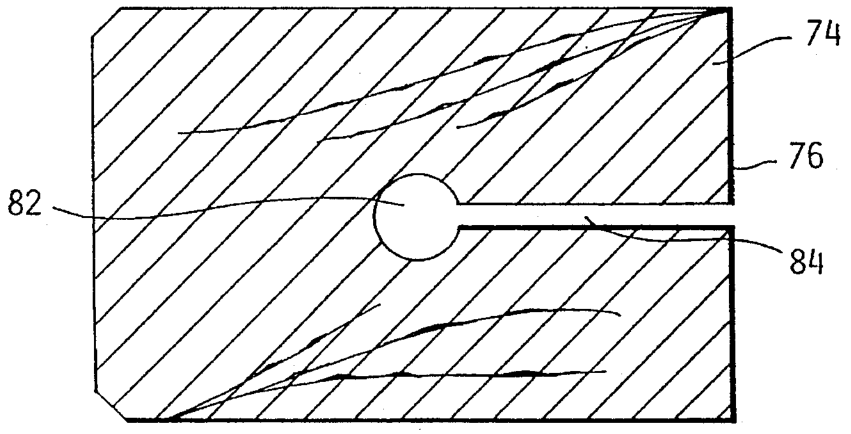
FIG. 12 is a top plan view of the center section showing the relative locations of the module bore and the cable slot.

The center section 74 is shown attached to the composite pad assembly 16 in FIG. 7 and in an upper plan view in FIG. 12. The section 74 has an inward edge 76, a centered module bore 82 that extends therethrough and a cable slot 84. The slot 84 as shown in FIG. 12 interfaces with the module bore 82 and extends normal to the inward edge 76. The module bore 82 is sized to be frictionally inserted over the electrical switch module 34. Likewise, the cable slot 84 is sized to be placed over the electrical cable assembly 50 as shown in FIG. 7. When the assembly 50 is inserted into the slot, the cable extends outward from the inward edge 76 of the center section 74.

Figure 13:
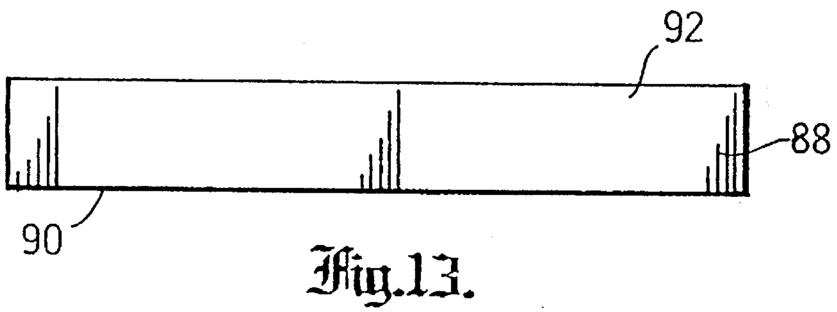
FIG. 13 is a elevational side view of the lower base section.

The lower base section 88 is shown attached in the composite pad assembly 16 in FIG. 7 and separated in an elevational view in FIG. 13. The section 88, which includes a lower surface 90 and an upper surface 92, functions as the main support for the composite pad assembly 16. As shown in FIG. 7, when the lower surface 62 of the upper pad section 60 is attached by an attachment means, to the upper surface 80 of the center section 74, and the lower surface 78 of the center section 74 is attached by an attachment means to the upper surface 92 of the lower base section 88, the composite pad assembly 16 is formed. The preferred attachment means for the composite pad assembly is a wood screw 96 that is inserted at each corner.

In the preferred embodiment of the dancing section 14, the upper pad section 60 and the center section 74 are constructed of a hardwood such as birch and have a thickness of 0.25 inches (0.635 cm). The lower base section 88, which is sized to encompass all of the composite pad assemblies 16 that are used to make a dance floor 12, is constructed of a particle board having a thickness of 0.5 inches (1.27 cm).

The dance floor 12 is comprised of at least one dancing section 14 that includes four composite dance assemblies 16 as shown in FIG. 1. Preferably, three dancing sections 14 are joined to produce a dance floor system that incorporates twelve composite dance assemblies 16. The output of each section is the analog trigger signal that is applied through the electrical cable assembly 50 which has four output jacks 56. The jacks are plugged into the musical instrument digital interface (MIDI) converter 100 as also shown in FIG. 1. The MIDI converter receives and converts the analog trigger signal from the jacks 56 to a corresponding digital signal. The digital signal is then applied to a MIDI equipped sound source 102 through an audio cable 58. The digital signal activates and allows the sound source 102 to output the specific sound produced by the selected sound source 102.

As shown in FIG. 1, the MIDI converter 100 used in the preferred embodiment is an Alesis DM-5 drum module. This module has the capability to receive, process and output up to twelve triggers. However, for the present design configuration as shown in FIG. 1, only four outputs are connected to selectable MIDI equipped sound sources 102. The sound sources 102 can be selected from several devices such as an Akai MIDI stereo digital sampler, an EMU ES1-32 digital sampler, a Yamaha SY-77 music synthesizer and an Alesis Midverb III. In summary, the system 10 is designed to allow the user to access a myriad of MIDI sound sources to virtually create any sound that is desired.

Figure 14:
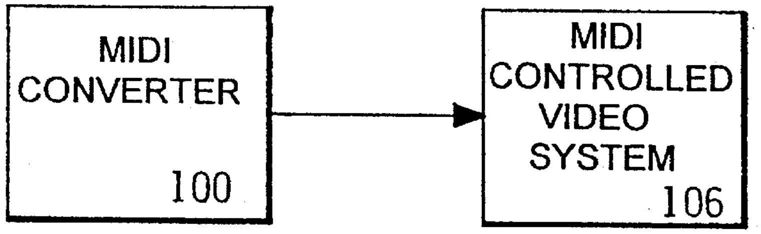
FIG. 14 is a block diagram of a MIDI converter connected to a MIDI controlled video system.
Figure 15:
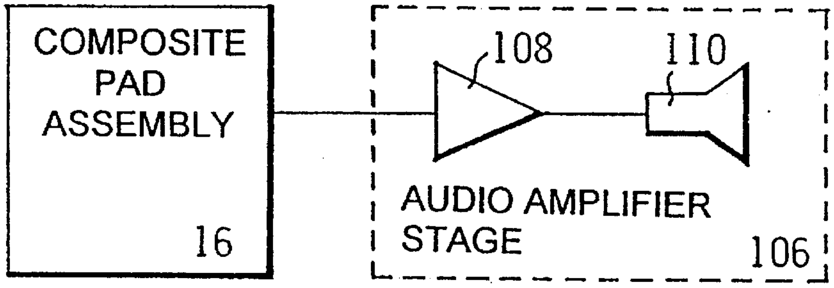
FIG. 15 is a block and schematic diagram of a composite pad assembly attached to an audio amplifier stage.

In addition to the basic combination of the MIDI converter 100 and the sound source 102, the MIDI converter 100 can be connected to a visual source 104 such as a MIDI controlled video system 106 as shown in FIG. 14. The video system produces a video image that compliments the sound signal. Also, the system can be designed to include an audio amplification stage 106 that consists of an audio amplifier 108 that drives a speaker 110 as shown in FIG. 15. The stage 106 is activated when a person steps on one or more of the composite pad assemblies 16. The stage 106, as an example, can be used to increase or alter the acoustic sounds of a tap dancer.

The electronic dance floor system can be easily produced by performing the following steps:

1. Drill a module bore 82 in the center of the center section 74 as shown in FIG. 12. The bore has a dimension similar to the dimension of the electrical switch module 34;
2. Cut a cable slot 84 in the center section 74 as also shown in FIG. 12. The slot interfaces with the module bore 82 and extends normal to the inward edge 76 of the center section 74;
3. Solder the two conductors on the electrical cable assembly 50 to the output terminals 42 on the electrical switch module 34 as shown in FIG. 7;
4. Insert the electrical switch module 34 into the module bore 82 with the electrical cable assembly 50 inserted into the cable slot 84 as shown in FIG. 7. When so inserted, the audio output jacks 56 extend outward from the inward edge 76 of said center section 74,
5. Secure the electrical switch module 34 and the cable 50 to the module bore 82 and the cable slot 84 respectively,
6. Temporarily place the lower surface 62 of the upper pad section 60 against the upper surface 80 of said center section 74;
7. Repeat steps 1. through 6. to form the next three composite pad assemblies 16;
8. Place the four composite pad assemblies 16 against the upper surface 92 of the lower base section 88. When so placed, the cables 50 are arranged so that all the cable jacks 56 extend from one edge of the dancing section 14 as shown in FIG. 1;
9. Secure each of the four composite pad assemblies 16 to the lower base section 88 to form the dance floor 12;
10. Connect each of the cable jacks 56 to a musical instrument digital interface (MIDI) converter 100;
11. Connect each MIDI converter 100 through an audio cable 58 to a MIDI equipped sound source 102.

Figure 16:
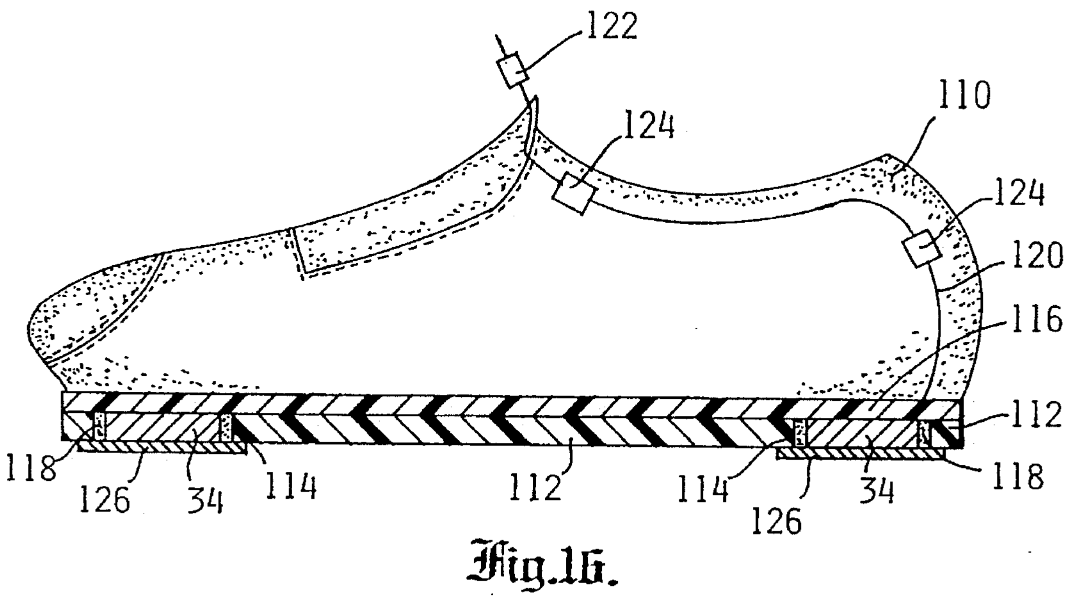
FIG. 16 is a partial sectional side view of a tapping shoe showing the relative location of the sole cavities, the electrical switch module and the tapping plates.
Figure 17:
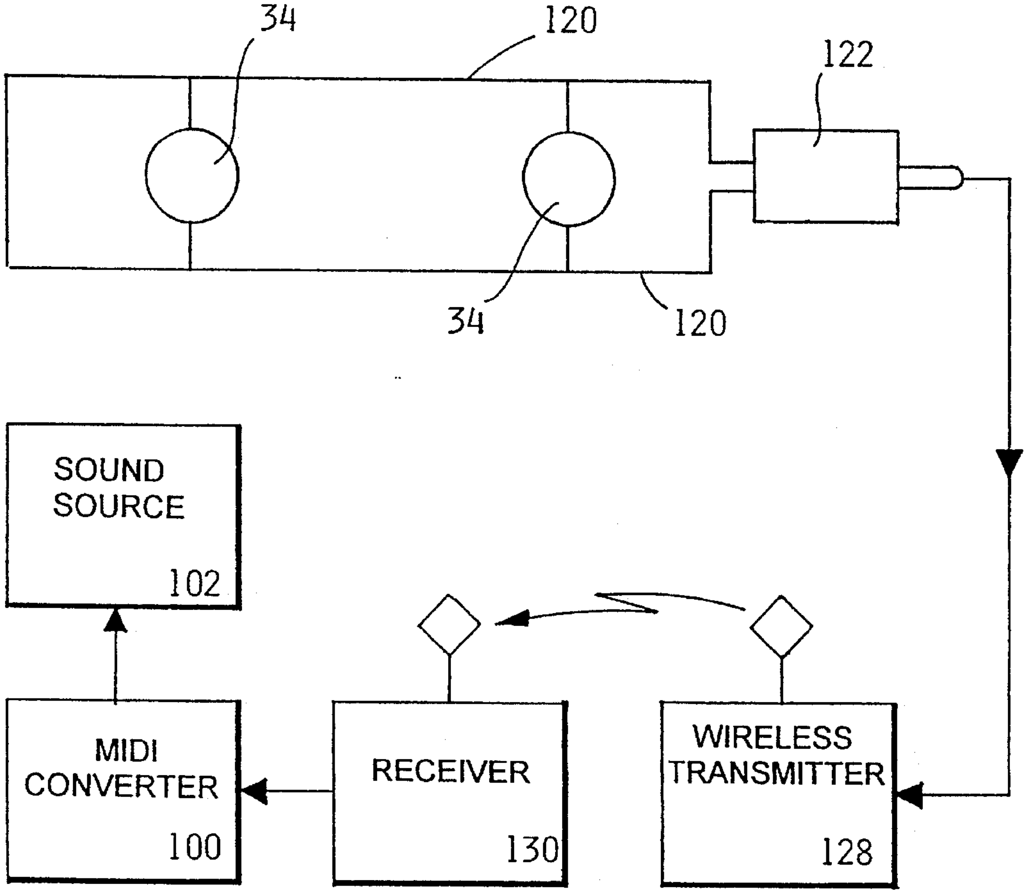
FIG. 17 is a block diagram showing the connections of the electrical switch modules, wireless transmitter, receiver, MIDI converter and sound source.

To further enhance the utility of the invention, the system may be operated in combination with a pair of electronic tapping shoes 110 as shown in FIGS. 16 and 17. Each of the shoes 110 incorporate a sole 112 as shown in FIG. 16, that has two switch cavities 114, one at the toe of the shoe and the other at the heel of the shoe, and a longitudinal wiring channel 116. Into each of the cavities 114, is inserted an electrical switch module 34. The module 34, which preferably consists of a piezzo buzzer element, is attached by an attachment means which is accomplished by wood screws (not shown). The space between the element 34 and the cavity 114 is filled with a resilient material 118. The material protects the element from unwanted movement and also evenly spreads a force striking any part of the shoe 110.

Each of the switch modules 34 includes a pair of electrical leads 120 that are routed through the wiring channel 116 as shown in FIG. 16, and that are connected in parallel as shown in FIG. 17. The electrical leads 120 from the wiring channel 116 are routed to the outside of the shoe 110. The leads terminate at an output jack 122 that projects upward from the vicinity of the shoe tongue and are held in place by a piece of tape 124 or the like.

Over each of the electrical switch modules 34 is located a tapping plate 126 that is attached by an attachment means. When any of the plates are pressed, a force is applied to the switch module 34 which then produces a trigger signal. The trigger signal as shown in FIG. 17, is applied via the output jack 120, to a wireless transmitter 128 that is attached to a piece of clothing such as a skirt or a pair of trousers. The transmitter 128 processes the trigger signal to produce an R.F. signal that is then applied to a receiver 130 where the signal is processed to produce an R.F. signal.

The MIDI converter 100 as shown in FIG. 17 receives and converts the trigger signal to a corresponding digital signal. This signal is applied through an audio cable to a MIDI equipped sound source 102. The sound source converts the digital signal to a specific sound produced by the sound source 102.

While the invention has been described in complete detail and pictorially shown in the accompanying drawings it is not to be limited to such details, since many changes and modifications may be made in the invention without departing from the spirit and scope thereof. Hence, it is described to cover any and all modifications and forms which may come within the language and scope of the appended claims.

We claim:

1. An electronic dance floor system comprising:

a) a composite pad assembly comprising:

(1) an electrical switch module having a side surface, an upper surface, a lower surface and an output that terminates at a pair of output terminals that project from the side surface, where said switch module closes when pressure is applied to the upper surface, (2) an electrical cable assembly having an inward end and an outward end, where the inward end is attached to the output terminals on said electrical switch module and the outward end is attached to an output jack, (3) an upper pad section having a lower surface and an upper surface, where to the center of the lower surface is attached, by an attachment means, the upper surface of said electrical switch module, (4) a lower base section having a lower surface and an upper surface, (5) a center section having an inward edge, a centered module bore extending therethrough and a cable slot that interfaces with the module bore and that extends normal to the inward edge, wherein said module bore is placed over said electrical switch module and the cable slot is placed over said cable such that the outward end of said cable extends outward from the inward edge of said center section, where when the lower surface of said upper pad section is attached, by an attachment means, to the upper surface of said center section, and the lower surface of said center section is attached, by an attachment means, to the upper surface of said lower base section said composite pad assembly is formed, wherein when pressure is applied to the upper surface of said upper pad section, the pressure closes said switch to produce an analog trigger signal that is applied through the output jack of said cable, b) a musical instrument digital interface (MIDI) converter which receives the trigger signal from said electrical switch module via the output jack and converts the signal to a corresponding digital signal, and c) a MIDI equipped sound source that through an audio cable, receives and converts the digital signal to a specific sound produced by said sound source.

2. The system as specified in claim 1 wherein said composite pad assembly has a rectangular shape.

3. The system as specified in claim 2 wherein a plurality of composite pad assemblies are arranged to produce a dancing section.

4. The system as specified in claim 3 wherein said dancing section is comprised of four composite pad assemblies arranged to form a rectangular dancing section.

5. The system as specified in claim 4 wherein a plurality of dancing sections are arranged to produce said dance floor.

6. The system as specified in claim 1 wherein said composite pad assembly has an equilateral triangular shape.

7. The system as specified in claim 1 wherein said composite pad assembly is in a pie shaped segment that allows a plurality of the pie shaped segment to be joined to form a circular dancing section.

8. The system as specified in claim 3 wherein said composite pad assemblies have complimentary attachment edges that allow interfacing assemblies to be temporarily attached.

9. The system as specified in claim 1 wherein said electrical switch module is comprised of a piezzo-electric element.

10. The system as specified in claim 1 wherein said electrical cable assembly comprises a shielded, two-conductor audio cable.

11. The system as specified in claim 1 wherein said upper pad section and said center section are constructed of a hardwood having a thickness of 0.25 inches (0.635 cm).

12. The system as specified in claim 11 wherein said hardwood is a birch.

13. The system as specified in claim 1 wherein said base section is constructed of a particle board having a thickness of 0.5 inches (1.27 cm).

14. The system as specified in claim 1 wherein said means for attaching said electrical switch module to said upper pad section comprises an adhesive.

15. The system as specified in claim 1 wherein said means for attaching said electrical switch module to said upper pad assembly comprises tape.

16. The system as specified in claim 1 wherein said means for attaching said upper pad section, center section and lower base section comprises a plurality of screws.

17. The system as specified in claim 1 wherein said sound source comprises an Alesis DM-5 drum module.

18. The system as specified in claim 1 wherein said sound source comprises an EMU ESI-32 sampler.

19. The system as specified in claim 1 wherein said sound source comprises an Alesis Midverb III.

20. The system as specified in claim 1 further comprising a video source that is connected to said MIDI converter and that produces a video image that compliments the sound signal.

21. The system as specified in claim 1 further comprising an audio amplification stage consisting of an audio amplifier that drives a speaker, where said stage is activated when a person steps on said composite pad assembly.

22. A process for producing an electronic dance floor system that is comprised of a dancing section consisting of four composite pad assemblies, wherein a plurality of dancing sections are arranged to produce said dance floor, where each composite pad assembly comprises an electrical switch module having a side surface, an upper surface, a lower surface and an output that terminates at a pair of output terminals that project from the side surface; an electrical cable assembly that preferably consists of a two-conductor audio cable having an inward end and an outward end, where to the outward end is attached an audio output jack; an upper pad section having a lower surface and an upper surface; a center section having an inward edge; a lower base section having a lower surface, an upper surface and that is dimensioned to accommodate four upper pad sections and four center sections; a musical instrument digital interface (MIDI) converter; and a MIDI equipped sound source; wherein said process comprises the following steps:

a) drill a module bore in the center of said center section having a dimension similar to the dimension of said electrical switch module, b) cut a cable slot in said center section that interfaces with the module bore and that extends normal to the inward edge of said center section, c) solder the two conductors on said electrical cable assembly to the output terminals on said electrical switch module, d) insert said electrical switch module into the module bore with the audio cable inserted into the cable slot with the audio output jacks extending outward from the inward edge of said center section, e) secure said module and said audio cable to the module bore and the cable slot respectively, f) temporarily place the lower surface of said upper pad section against the upper surface of said center section, g) repeat steps a) through f) to form the next three composite pad assemblies, h) place the four composite pad assemblies against the upper surface of said lower base section with each of said audio cables arranged so that all the cable jacks extend from one edge of said dancing section, i) secure each of said four composite pad assemblies to said lower base section to form the dance floor, j) connect each of the cable jacks to a musical instrument digital interface (MIDI) converter, and k) connect each MIDI converter to a MIDI equipped sound source.

* * * * *